(12) United States Patent
Nakamura et al.

(10) Patent No.: US 10,608,223 B2
(45) Date of Patent: Mar. 31, 2020

(54) METHOD FOR MANUFACTURING SEPARATOR FOR FUEL CELL

(71) Applicant: TOYOTA JIDOSHA KABUSHIKI KAISHA, Toyota-shi, Aichi (JP)

(72) Inventors: Hideo Nakamura, Toyota (JP); Kazuomi Yamanishi, Tajimi (JP); Hiroki Okabe, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 30 days.

(21) Appl. No.: 16/150,602

(22) Filed: Oct. 3, 2018

(65) Prior Publication Data

US 2019/0148693 A1 May 16, 2019

(30) Foreign Application Priority Data

Nov. 10, 2017 (JP) .................. 2017-217557

(51) Int. Cl.
| | | |
|---|---|---|
| H01M 2/14 | (2006.01) | |
| H01M 8/0239 | (2016.01) | |
| H01M 8/0245 | (2016.01) | |
| H01M 8/0206 | (2016.01) | |
| H01M 8/0234 | (2016.01) | |

(52) U.S. Cl.
CPC ......... *H01M 2/145* (2013.01); *H01M 8/0206* (2013.01); *H01M 8/0234* (2013.01); *H01M 8/0239* (2013.01); *H01M 8/0245* (2013.01)

(58) Field of Classification Search
CPC .. H01M 2/145; H01M 8/0206; H01M 8/0234; H01M 8/0239; H01M 8/0245
See application file for complete search history.

(56) References Cited

U.S. PATENT DOCUMENTS

| 4,759,989 | A | * | 7/1988 | Abe ........................ H01M 4/96 428/408 |
| 2009/0081522 | A1 | | 3/2009 | Washima et al. |
| 2013/0177832 | A1 | * | 7/2013 | Tsubosaka .......... H01M 8/0271 429/480 |
| 2018/0034070 | A1 | | 2/2018 | Tarutani et al. |
| 2018/0327541 | A1 | * | 11/2018 | Arita .................. C08G 59/4223 |

FOREIGN PATENT DOCUMENTS

| JP | 2009076303 A | 4/2009 |
| JP | 6112262 B2 | 3/2017 |

* cited by examiner

*Primary Examiner* — Susan D Leong
(74) *Attorney, Agent, or Firm* — Dickinson Wright PLLC

(57) ABSTRACT

A method for manufacturing a separator for fuel cell including a seal part of thermosetting resin can have improved productivity. The method includes a placing step to place uncured thermosetting resin on a substrate, a pre-curing step to pre-cure the uncured thermosetting resin on the substrate, and a curing step to cure the pre-cured thermosetting resin on the collected plurality of substrates to collectively form the seal parts on the plurality of substrates.

4 Claims, 13 Drawing Sheets

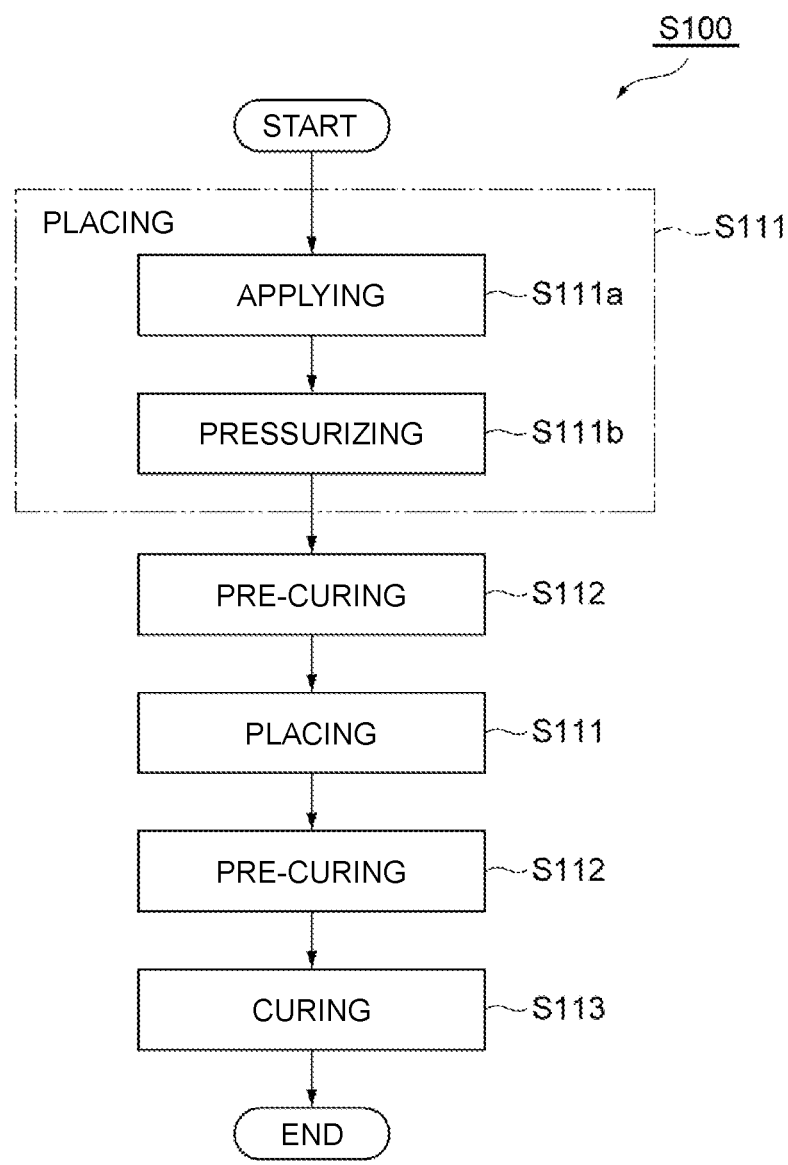

METHOD FOR MANUFACTURING SEPARATOR FOR FUEL CELL

CROSS REFERENCE TO RELATED APPLICATIONS

The present application claims priority from Japanese patent application JP 2017-217557 filed on Nov. 10, 2017, the content of which is hereby incorporated by reference into this application.

BACKGROUND

Technical Field

The present disclosure relates to a method for manufacturing a separator for fuel cell.

Background Art

Conventionally inventions about the separators for fuel cell have been known (see JP 2009-076303 A, for example). The invention of JP 2009-076303 A aims to provide a separator for fuel cell that can avoid direct exposure of the core surface to corrosive environment while reducing the number of components and manufacturing the separator simply and at low cost. To fulfill the aim, JP 2009-076303 A discloses a metal composite for fuel cells having the following structure.

The metal composite for fuel cells described in this document includes a metal core, and cladded layers made of corrosion resistant metal that covers the surface of the core. A through-hole is formed through the core and the cladded layers. In this metal composite for fuel cells, the through-hole has a concave on the inner wall of the through-hole at a part corresponding to the core, and the concave is recessed relative to a part of the inner wall of the through-hole corresponding to the cladded layers.

This document also discloses the concave that is filled with a dissolution-inhibiting material, such as resin, to prevent dissolution of the core. This document also discloses the advantageous effect of the metal composite for fuel cells having the above structure. That is, various fuel cell components including a separator for fuel cell, which are obtained by processing such a metal composite, can have extended service life, and the range of choices for material of the core can be extended.

SUMMARY

The above document about a conventional metal composite for fuel cells discloses a two-component adhesive containing epoxy resin as the main component and polyamidoamine as a hardener as one example of the dissolution-inhibiting material. Such an adhesive requires a long time for curing. To prepare a fuel cell stack including a plurality of fuel cells stacked, hundreds of separators are used. If the adhesive is hardened for each separator, it takes a huge amount of time, and the productivity of the separators for fuel cell will deteriorate.

To increase the productivity, a plurality of separators each including uncured adhesive placed may be collected, and such uncured adhesive placed on the plurality of separators may be collectively cured. Uncured adhesive, however, flows easily, and therefore the shape of the adhesive may be changed variously during conveyance of the separators, or the adhesive may be cured at an unexpected position.

One aspect of the present disclosure is a method for manufacturing a separator for fuel cell that includes a seal part of thermosetting resin. The method includes: a placing step of placing uncured thermosetting resin on a substrate; a pre-curing step of pre-curing the uncured thermosetting resin placed on the substrate; and a curing step of collecting a plurality of the substrates and curing the pre-cured thermosetting resin to collectively form the seal parts on the plurality of substrates.

The placing step places uncured thermosetting resin on the substrate of the separator for fuel cell at a part where a seal part of the thermosetting resin is to be formed. The seal part of the separator for fuel cell is formed on the inner wall of the through-hole of the substrate or on a part of the surface of the substrate, for example. That is, the placing step places uncured thermosetting resin on a part of the substrate.

The through-hole of the substrate of the separator for fuel cell serves as a manifold to supply and discharge reactant gas or coolant, for example, when a plurality of fuel cells is stacked to be a fuel cell stack. One of the surfaces of the substrate of the separator for fuel cell defines a conduit for coolant, for example, with the neighboring fuel cell when a plurality of fuel cells is stacked to be a fuel cell stack.

The seal part formed on the inner wall of the through-hole of the substrate of the separator for fuel cell covers the inner wall of the through-hole of the substrate so that the inner wall of the through-hole of the substrate does not come in contact with reactant gas or coolant, for example. The seal part on the surface of the substrate of the separator for fuel cell functions as a seal for the conduit of coolant that is defined between the mutually opposed fuel cells when the fuel cells are stacked to be a fuel cell stack, for example, and prevents the leakage of the coolant.

As stated above, the pre-curing step pre-cures the uncured thermosetting resin placed on the substrate. Pre-curing means that the uncured thermosetting resin after pre-curing is not completely cured, and is in a semi cross-linked state before the thermosetting resin is completely cross-linked. The pre-curing step pre-cures the uncured thermosetting resin placed on the substrate. This can prevent the flowing of the thermosetting resin and can facilitate the handling of the substrate, such as conveyance, as compared with the substrate having uncured thermosetting resin thereon.

As stated above, the curing step collects a plurality of substrates subjected to the pre-curing step and then cures the pre-cured thermosetting resin on the substrates to collectively form the seal parts on the plurality of substrates. In this way, a plurality of substrates is collected, and the seal parts are collectively formed on the plurality of substrates. This can remarkably improve the productivity of the separator for fuel cell as compared with the method of curing the thermosetting resin for each substrate. The pre-curing step pre-cures the thermosetting resin, which can prevent the flowing of the thermosetting resin. In this way, the separator for fuel cell can have stable shape and position of the seal parts of the thermosetting resin.

The placing step as stated above may include: an applying step of applying the uncured thermosetting resin on a surface of the substrate; and a pressurizing step of placing the substrate in a forming die and pressurizing the uncured thermosetting resin applied on the surface of the substrate at the applying step with the forming die to allow the resin to flow into a through-hole of the substrate so as to place the uncured thermosetting resin on an inner wall of the through-hole. In this case, the hot pressing step, which is a currently-existing step in the method for manufacturing a separator for fuel cell, can complete the placing step during the step. This can reduce the number of steps, and can improve the productivity of the method for manufacturing a separator for fuel cell.

In the placing step as stated above, the uncured thermosetting resin may be placed by injection molding on the substrate in the forming die, and in the pre-curing step as stated above, the forming die may be heated so as to pre-cure the uncured thermosetting resin placed on the substrate at the placing step. This enables the placing step and the pre-curing step using the forming die, and so can improve the productivity of the method for manufacturing a separator for fuel cell.

The placing step and the pre-curing step may be repeated a plurality of times before the curing step. For the structure of a separator for fuel cell having seal parts at a plurality of different positions, this enables appropriate placing step and pre-curing step depending on the positions of the seal parts, and so can improve the productivity of the method for manufacturing a separator for fuel cell.

More specifically, the method for manufacturing a separator for fuel cell includes a substrate processing step, an insulating part applying step, a conductive part applying step, a hot pressing step, an injection molding step and a thermal treatment step, for example.

The substrate processing step is to process a base material that is a material of the substrate into the substrate for a separator for fuel cell by cutting, trimming and washing. The insulating part applying step is to apply uncured thermosetting resin having electric insulating property at the edge on the surface of the substrate. The thermosetting resin may be applied to have a frame-form by screen printing, for example. The conductive part applying step is to apply uncured thermosetting resin containing a conductive material, such as carbon, to have conductive property. The thermosetting resin is applied inside of the frame-form thermosetting resin that is applied at the edge on the surface of the substrate and at a center part of the surface of the substrate with a slot die, for example.

The hot pressing step is to place the substrate subjected to the insulating part applying step and the conductive part applying step in a forming die for pressing to give the substrate ridges and furrows or a corrugated shape of the fuel cell separator that serve as a conduit for reactant gas in the fuel cell. This hot pressing step pressurizes the uncured thermosetting resin applied at the edge on the surface of the substrate to allow the uncured thermosetting resin to flow into the through-holes of the substrate. Thereby the uncured thermosetting resin is placed on the inner wall of the through-holes. This hot pressing step also heats the forming die to pre-cure the uncured thermosetting resin.

The injection molding step following the hot pressing step is to place uncured thermosetting resin at a part of the surface of the substrate placed in the forming die by injection molding, and then heat the forming die so as to pre-cure the uncured thermosetting resin on the substrate. After the injection molding step, the substrate is removed from the forming die, and a plurality of these substrate are collected. The thermal treatment step is to heat this plurality of substrates collectively to cure the pre-cured thermosetting resin and collectively form the seal parts on the plurality of substrates.

In this way, the method for manufacturing a separator for fuel cell includes a substrate processing step, an insulating part applying step, a conductive part applying step, a hot pressing step, an injection molding step and a thermal treatment step. In this case, the insulating part applying step and pressing at the hot pressing step correspond to the placing step as stated above. More specifically the insulating part applying step corresponds to the applying step in the placing step as stated above. Pressing at the hot pressing step corresponds to the pressurizing step in the placing step as stated above, and heating at the hot pressing step corresponds to the pre-curing step as stated above. The injection molding step corresponds to the second placing step and the pre-curing step as stated above, and the thermal treatment step corresponds to the curing step as stated above.

According to one embodiment of the present disclosure, a method for manufacturing a separator for fuel cell can be provided, which can improve the productivity without changing a shape and a position of the seal parts of the thermosetting resin to be formed on the separator for fuel cell as compared with the conventional method.

BRIEF DESCRIPTION OF THE DRAWINGS

FIG. 1A is a flowchart of a method for manufacturing a separator for fuel cell according to one embodiment of the present disclosure;

DETAILED DESCRIPTION

Figure 1B:
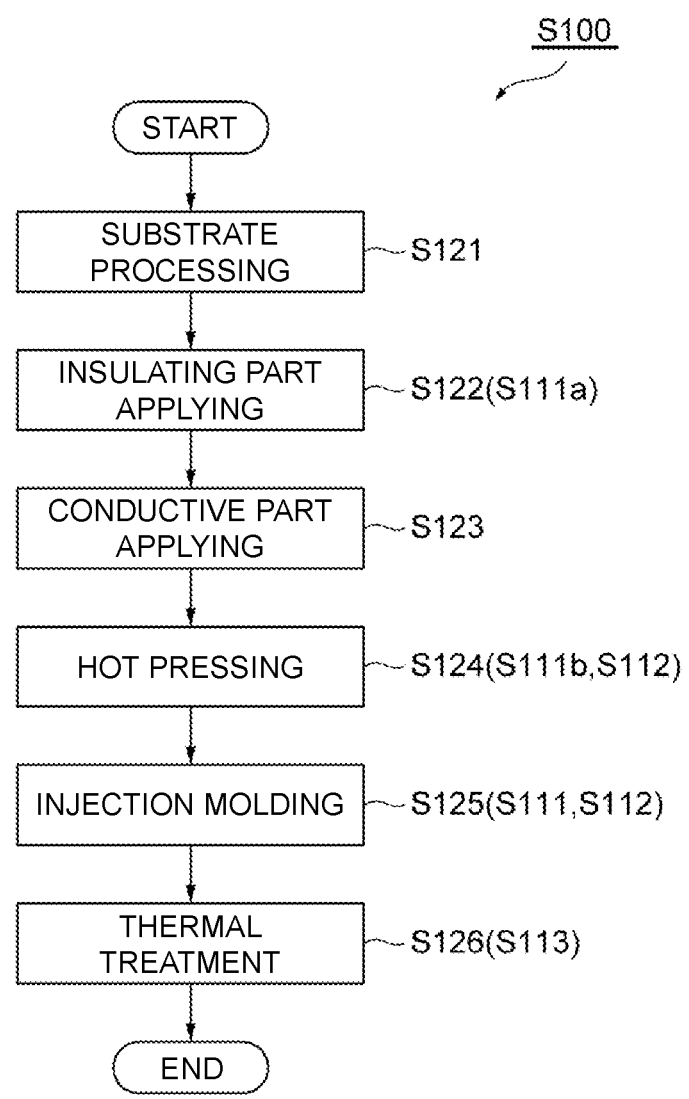
FIG. 1B is a flowchart of a method for manufacturing a separator for fuel cell according to one embodiment of the present disclosure.

The following describes one embodiment of a method for manufacturing a separator for fuel cell according to the present disclosure, with reference to the drawings. FIG. 1A and FIG. 1B are flowcharts of a method for manufacturing a separator for fuel cell S100 according to one embodiment of the present disclosure.

A separator for fuel cell manufactured by the manufacturing method S100 of the present embodiment is a plate-like member as a component of a fuel cell. Separators as a component of a fuel cell are disposed on both sides of a MEGA (Membrane-Electrode-Gas Diffusion Layer Assembly) so as to sandwich the MEGA between them. These separators define conduits for reactant gas along one face and the other face of the MEGA. In the fuel-cell stack including a plurality of fuel cells stacked, neighboring separators in the stacking direction define a conduit for coolant.

The method for manufacturing a separator for fuel cell S100 of the present embodiment, which will be described later in details, is to manufacture a separator for fuel cell having seal parts 11, 12 of thermosetting resin 2, 4 (see FIG. 6C). As shown in FIG. 1A, the method includes a placing step S111, a pre-curing step S112 and a curing step S113. The placing step S111 is to place uncured thermosetting resin 2 on a substrate 1 (see FIGS. 3A to 3C as well as FIG. 6A). The pre-curing step S112 is to pre-cure the uncured thermosetting resin 2 placed on the substrate 1 (see FIGS. 5D and 6C). The curing step S113 is to collect a plurality of substrates 1 and then cure the pre-cured thermosetting resin 2 to collectively form seal parts 11 on the plurality of substrates 1 (see FIG. 7).

In an example of FIG. 1A, the method for manufacturing a separator for fuel cell S100 includes the placing step S111 and the pre-curing step S112 that are repeated twice prior to the curing step S113. The first placing step S111 includes an applying step S111a and a pressurizing step S111b. The applying step S111a is to apply uncured thermosetting resin 2 on the surface of a substrate 1 (see FIG. 3A). The pressurizing step S111b is to place the substrate 1 in a forming die D2 and pressurize the uncured thermosetting resin 2 applied on the surface of the substrate 1 at the applying step S111a with the forming die D2 to allow the resin to flow into through-holes 1a of the substrate 1. Thereby the uncured thermosetting resin 2 is placed on the inner wall of each through-hole 1a (see FIG. 5C).

In the example of FIG. 1A, the method for manufacturing a separator for fuel cell S100 includes the second placing step S111. In this step, uncured thermosetting resin 4 is placed by injection molding on the substrate 1 in the forming die D2 (see FIG. 6A). The method also includes the second pre-curing step S112. In this step, the forming die D2 is heated so as to pre-cure the uncured thermosetting resin 4 placed on the substrate 1 at the second placing step S111 (see FIG. 6C). The repeated numbers of the placing steps S111 and the pre-curing steps S112 prior to the curing step S113 are not limited to two, which may be three or more.

More specifically, as shown in FIG. 1B, the method for manufacturing a separator for fuel cell S100 of the present embodiment includes a substrate processing step S121, an insulating part applying step S122, a conductive part applying step S123, a hot pressing step S124, an injection molding step S125 and a thermal treatment step S126, for example.

Figure 2A:
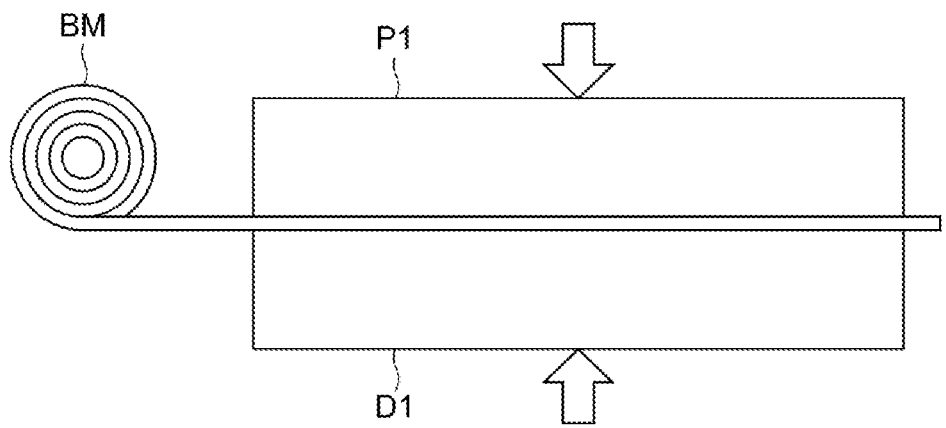
FIG. 2A schematically shows the substrate processing step of FIG. 1B.
Figure 2B:
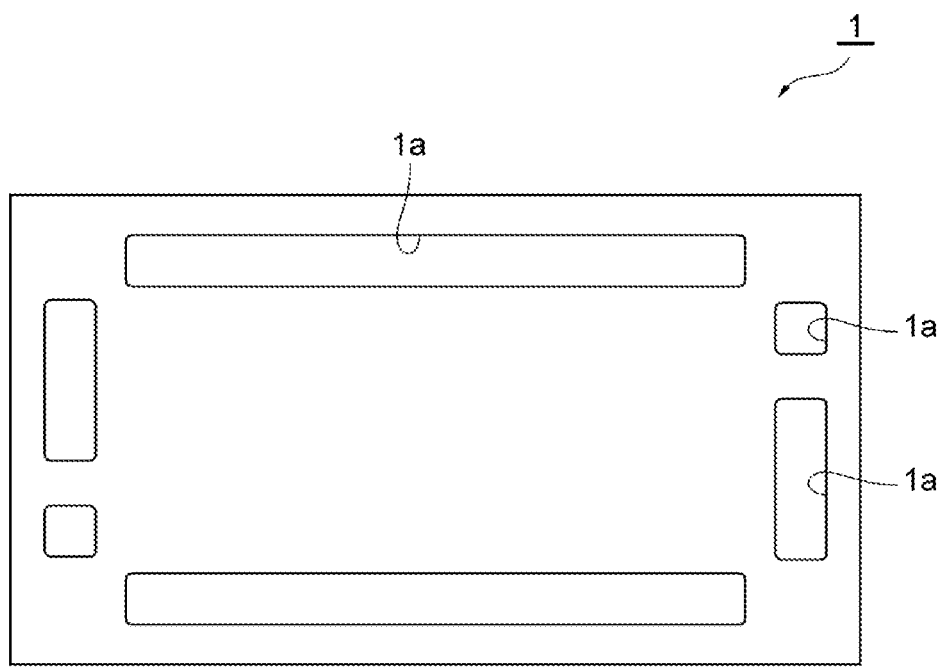
FIG. 2B is a schematic plan view of the substrate that is processed at the substrate processing step of FIG. 2A.

FIG. 2A schematically shows the substrate processing step S121 of FIG. 1B. FIG. 2B is a schematic plan view of the substrate 1 that is processed at the substrate processing step S121 of FIG. 2A. The substrate processing step S121 is to process a base material BM that is a material of the substrate 1 of a separator for fuel cell into the substrate 1 for a separator for fuel cell by cutting, trimming and washing.

Examples of the base material BM include a thin plate coil of stainless steel. Examples of the stainless steel include SUS316L having excellent corrosion resistance and formability. A strip of the base material BM extracted from the coil may be processed, such as pressing and punching, with a punch P1 and a die D1, for example. As a result of the processing, a substrate 1 can be obtained, having a substantially rectangular outline and a plurality of through-holes 1a at the edge.

The through-holes 1a of the substrate 1 serve as a manifold to supply and discharge reactant gas or coolant, for example, when a plurality of fuel cells is stacked to be a fuel cell stack. One of the surfaces of the substrate 1 defines a conduit for coolant, for example, with the neighboring fuel cell when a plurality of fuel cells is stacked to be a fuel cell stack. The substrate 1 obtained from the base material BM by punching undergoes washing and drying, and then is conveyed to the insulating part applying step S122.

Figure 3A:
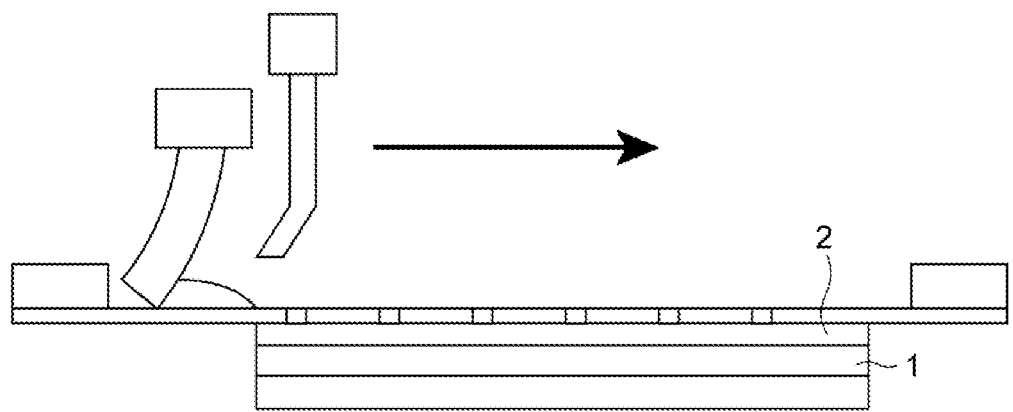
FIG. 3A schematically shows the insulating part applying step of FIG. 1B.
Figure 3B:
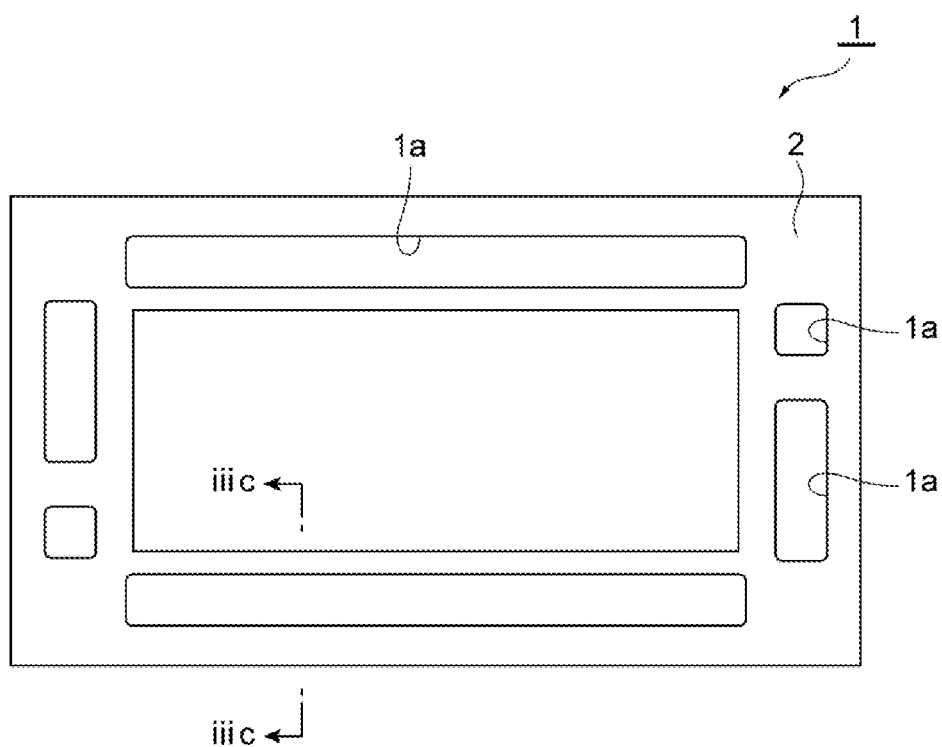
FIG. 3B is a schematic plan view of the substrate that is processed at the insulating part applying step of FIG. 3A.
Figure 3C:
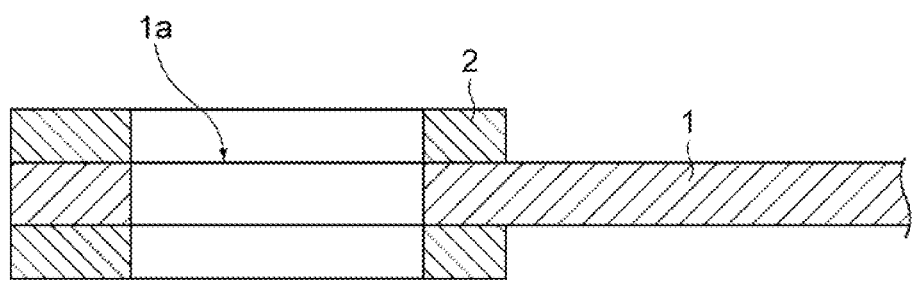
FIG. 3C is an enlarged cross-sectional view taken along the line iiic-iiic of FIG. 3B.

FIG. 3A schematically shows the insulating part applying step S122 of FIG. 1B. FIG. 3B is a schematic plan view of the substrate 1 that is processed at the insulating part applying step S122 of FIG. 3A. FIG. 3C is an enlarged cross-sectional view of the substrate 1 taken along the line iiic-iiic of FIG. 3B. The insulating part applying step S122 is to apply uncured thermosetting resin 2 having electric insulating property at the edge on the surface of the substrate 1. The thermosetting resin may be applied to have a frame-form by screen printing, for example.

More specifically at the insulating part applying step S122, uncured thermosetting resin 2 is applied by screen printing at the edge on the surface of the substrate 1 at a part other than a center area of the substrate 1 to place a MEGA. At this step, the uncured thermosetting resin 2 is not placed on the inner wall of the through-holes 1a at the edge of the substrate 1. For the thermosetting resin 2, one-component epoxy resin having a property of completely curing during a heating time of about 1 minute at the temperature of about 180° C. may be used, for example. In this way, the uncured thermosetting resin 2 having electric insulating property is applied at the edge of the substrate 1, and this substrate is conveyed to the conductive part applying step S123.

Figure 4A:
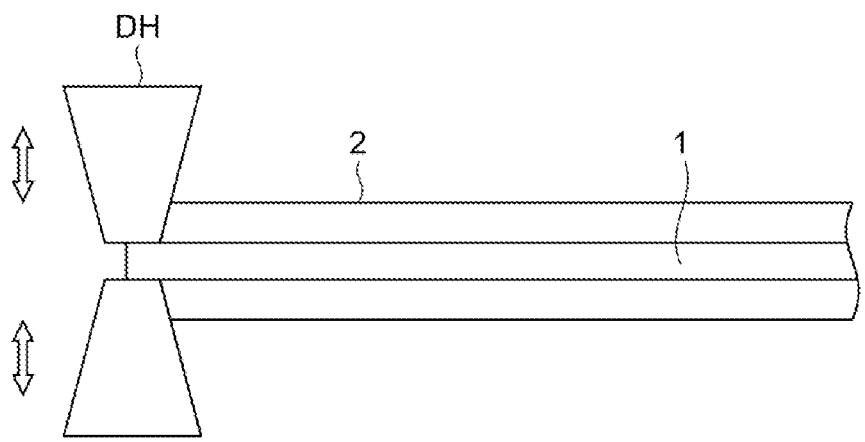
FIG. 4A schematically shows the conductive part applying step of FIG. 1B.
Figure 4B:
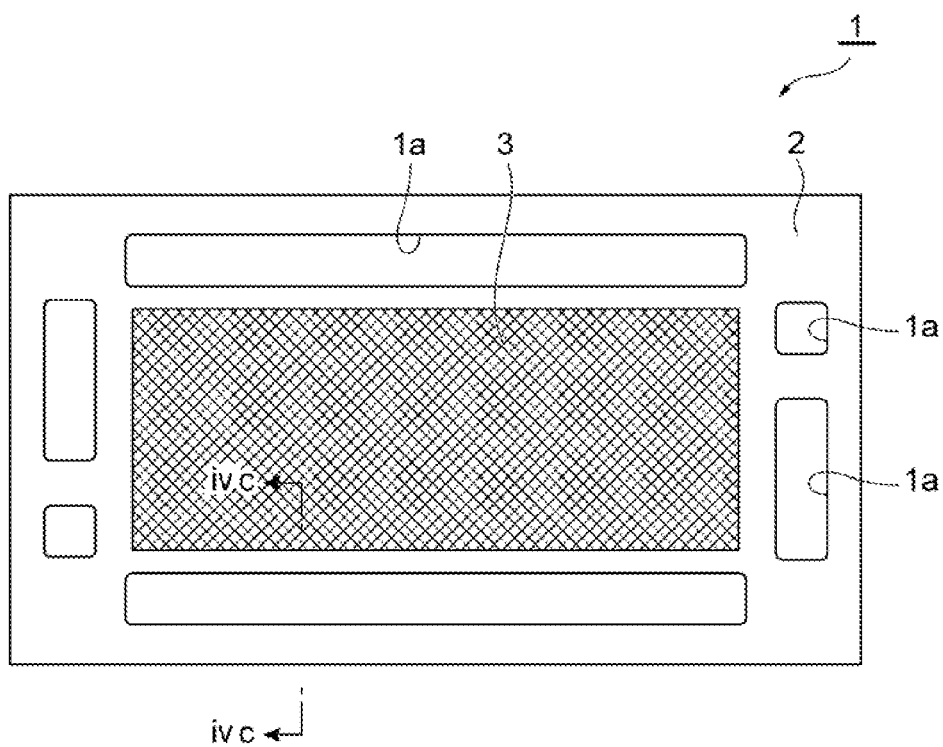
FIG. 4B is a schematic plan view of the substrate that is processed at the conductive part applying step of FIG. 4A.
Figure 4C:
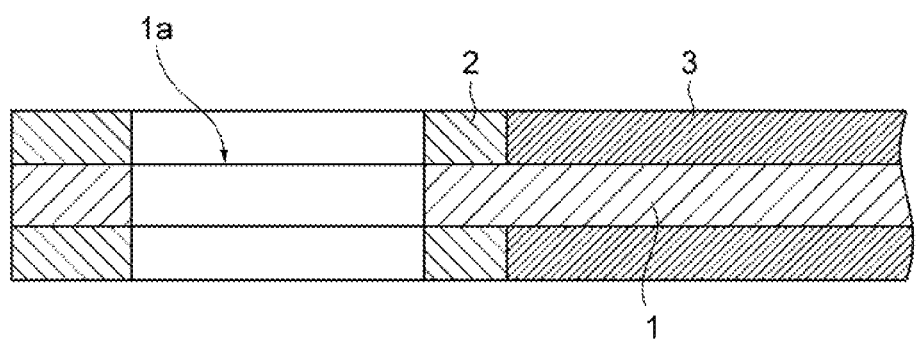
FIG. 4C is an enlarged cross-sectional view taken along the line ivc-ivc of FIG. 4B.

FIG. 4A schematically shows the conductive part applying step S123 of FIG. 1B. FIG. 4B is a schematic plan view of the substrate 1 that is processed at the conductive part applying step S123 of FIG. 4A. FIG. 4C is an enlarged cross-sectional view of the substrate 1 taken along the line ivc-ivc of FIG. 4B. The conductive part applying step S123 is to apply uncured thermosetting resin 3 containing a conductive material, such as carbon, to have conductive property. The thermosetting resin at this step is applied inside of the frame-form thermosetting resin 2 that is applied at the edge on the surface of the substrate 1 and at a center part of the surface of the substrate 1 with a slot die, for example.

More specifically at the conductive part applying step S123, the uncured thermosetting resin 3 is applied on the substrate 1 while pushing the resin out from a die head DH. The thickness of the uncured thermosetting resin 3 applied depends on the amount of the resin discharged from the die head DH and the speed of the die head DH relative to the substrate 1. The size of the discharge outlet of the die head DH is determined based on the viscosity of the uncured thermosetting resin 3 and the thickness of the applied resin as a target.

For the uncured thermosetting resin 3 having conductive property, slurry may be used, which contains 30 wt % of one-component epoxy resin that is similar to the uncured thermosetting resin 2 used at the insulating part applying step S122 mixed with 50 wt % of carbon black and 20 wt % of solvent. Such a substrate 1, which includes the uncured thermosetting resin 2 having electric insulating property applied at the edge on the surface of the substrate and the uncured thermosetting resin 3 having conductive property applied at a center part inside of the edge, is conveyed to the hot pressing step S124.

Figure 5A:
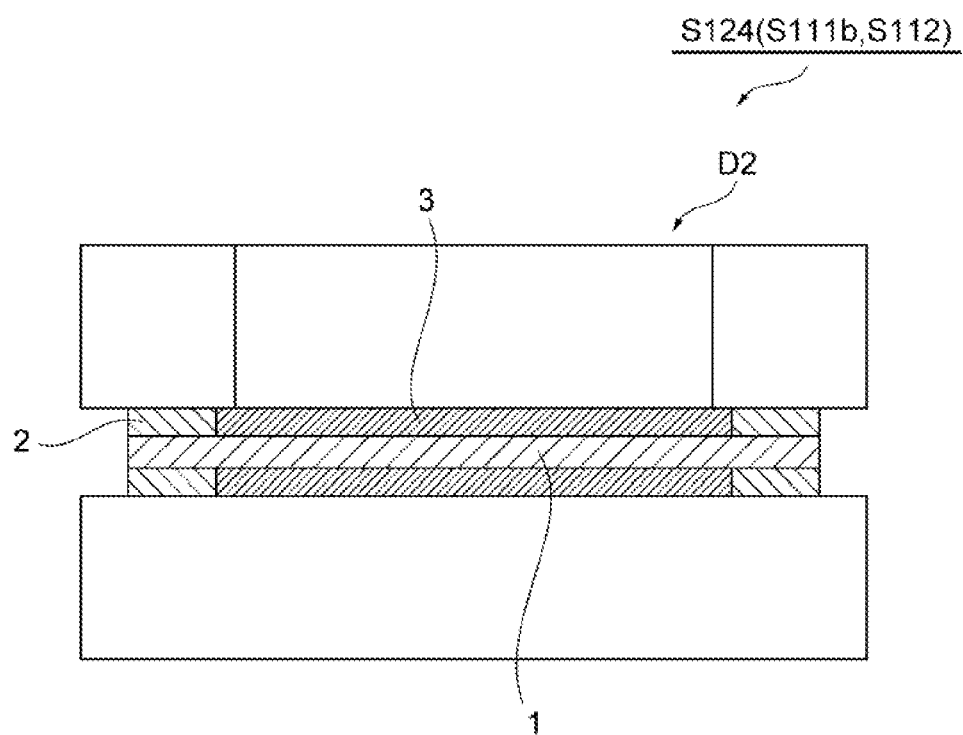
FIG. 5A schematically shows the hot pressing step of FIG. 1B.
Figure 5B:
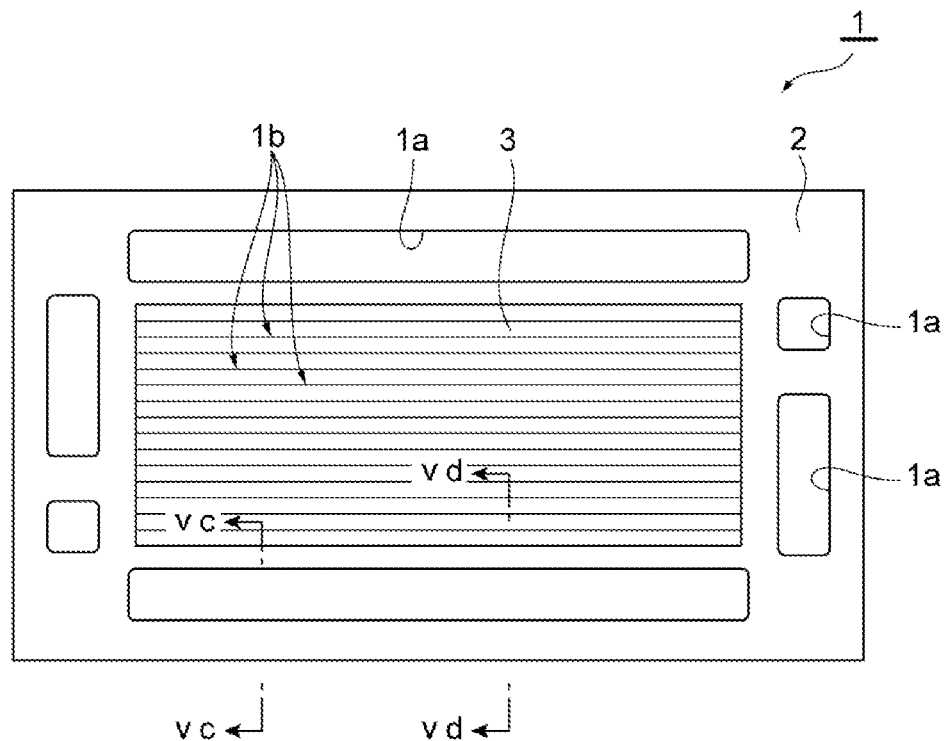
FIG. 5B is a schematic plan view of the substrate that is processed at the hot pressing step of FIG. 5A.
Figure 5C:
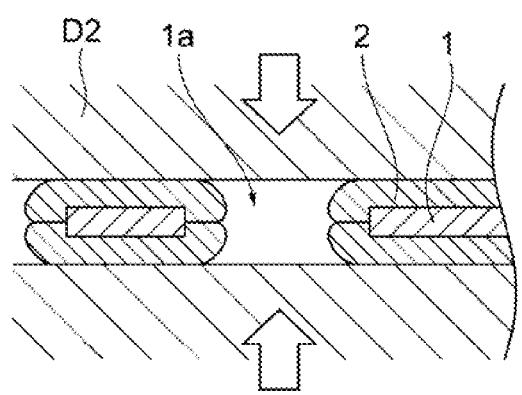
FIG. 5C is an enlarged cross-sectional view during pressing of the substrate, which is taken along the line vc-vc of FIG. 5B.
Figure 5D:
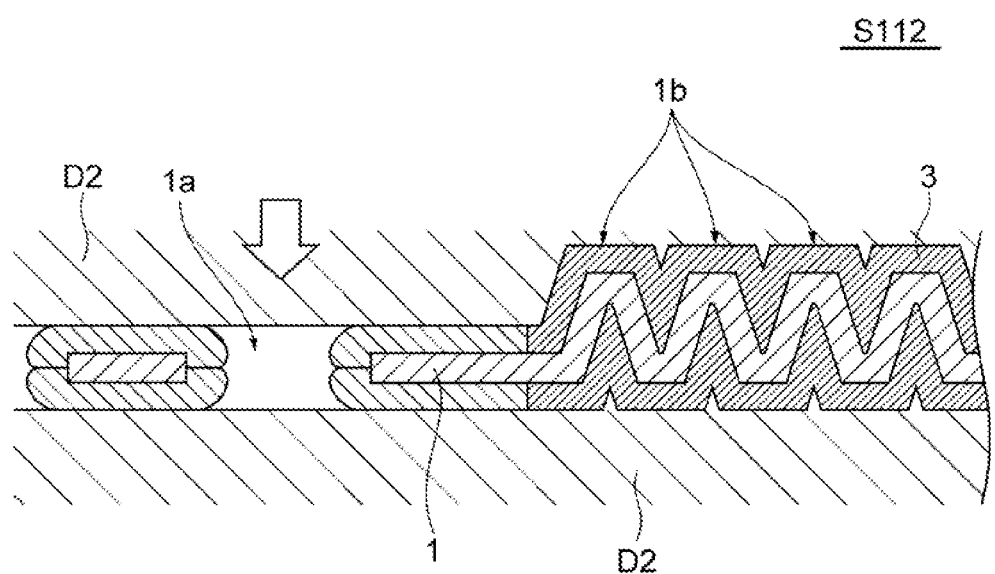
FIG. 5D is an enlarged cross-sectional view during heating of the substrate, which is taken along the line vd-vd of FIG. 5B.

FIG. 5A schematically shows the hot pressing step S124 of FIG. 1B. FIG. 5B is a schematic plan view of the substrate 1 that is processed at the hot pressing step S124 of FIG. 5A. FIG. 5C is an enlarged cross-sectional view of the substrate 1 during pressing at the hot pressing step S124 of FIG. 5A taken along the line vc-vc of FIG. 5B. FIG. 5D is an enlarged cross-sectional view of the substrate 1 during heating at the hot pressing step S124 of FIG. 5A taken along the line vd-vd of FIG. 5B.

The hot pressing step S124 is to place the substrate 1 subjected to the insulating part applying step S122 and the conductive part applying step S123 in a forming die D2 for pressing to give the substrate 1 ridges and furrows or a corrugated shape 1b of the fuel cell separator that serve as a conduit for reactant gas in the fuel cell. While giving the ridges and furrows or the corrugated shape 1b to the substrate 1, as shown in FIG. 5C, this pressing step is to press the substrate 1 with the forming die D2 so as to pressurize the uncured thermosetting resin 2 applied on the surface of the substrate 1 at the edge and allow the resin to flow. As a result, the uncured thermosetting resin 2 flows into the through-holes 1a of the substrate 1 to be placed on the inner wall of the through-holes 1a.

As shown in FIG. 5D, this hot pressing step S124 is also to heat the forming die D2 so as to pre-cure the uncured thermosetting resin 2 placed on the inner wall of the through-holes 1a of the substrate 1. Note here that in this hot pressing step S124, pressing and heating may be performed at the same time, or a time interval may be given between pressing and heating. When the uncured thermosetting resin 2 is one-component epoxy resin having a property of completely curing during a heating time of about 1 minute at the temperature of about 180° C. as stated above, the uncured thermosetting resin 2 can be pre-cured by setting the heating temperature with the forming die D2 at about 180° C. and setting the heating time at about 10 seconds, for example.

Pre-curing means that the uncured thermosetting resin 2 after pre-heating is not completely cured, and is in a semi cross-linked state before the thermosetting resin 2 is completely cross-linked. After pre-curing at the hot pressing step S124, the forming die D2 of a rotary type, for example, is rotated, so as to place the substrate 1 having the pre-cured thermosetting resin 2 at a position adjacent to an injection machine I that injects uncured thermosetting resin 3. In this way, the substrate is conveyed to the injection molding step S125 (see FIG. 6A).

Figure 6A:
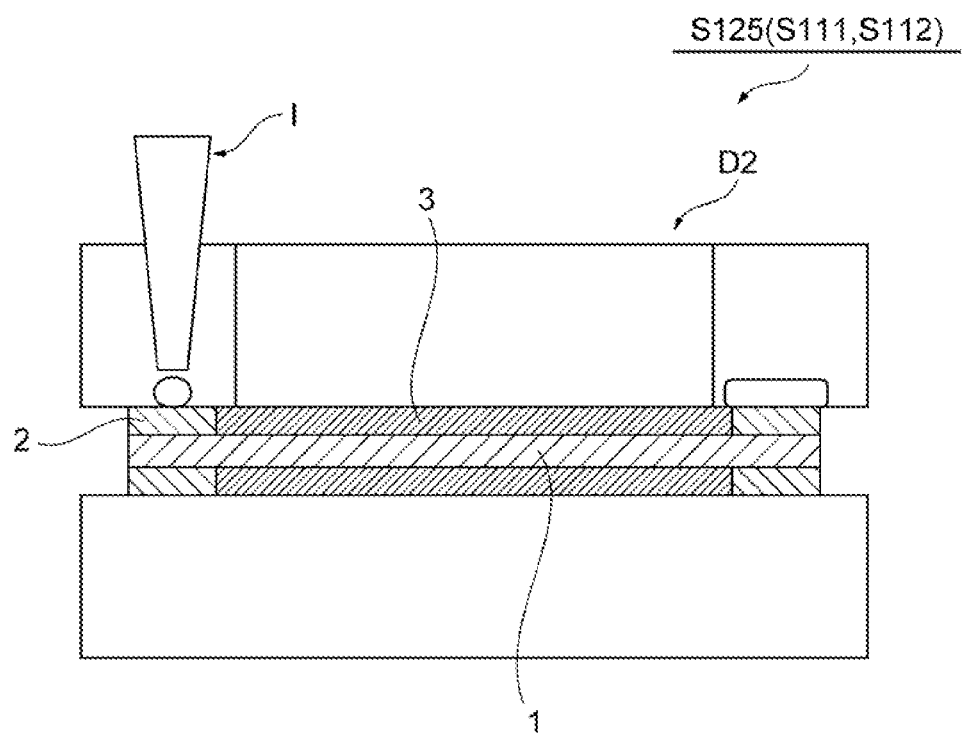
FIG. 6A schematically shows the injection molding step of FIG. 1B.
Figure 6B:
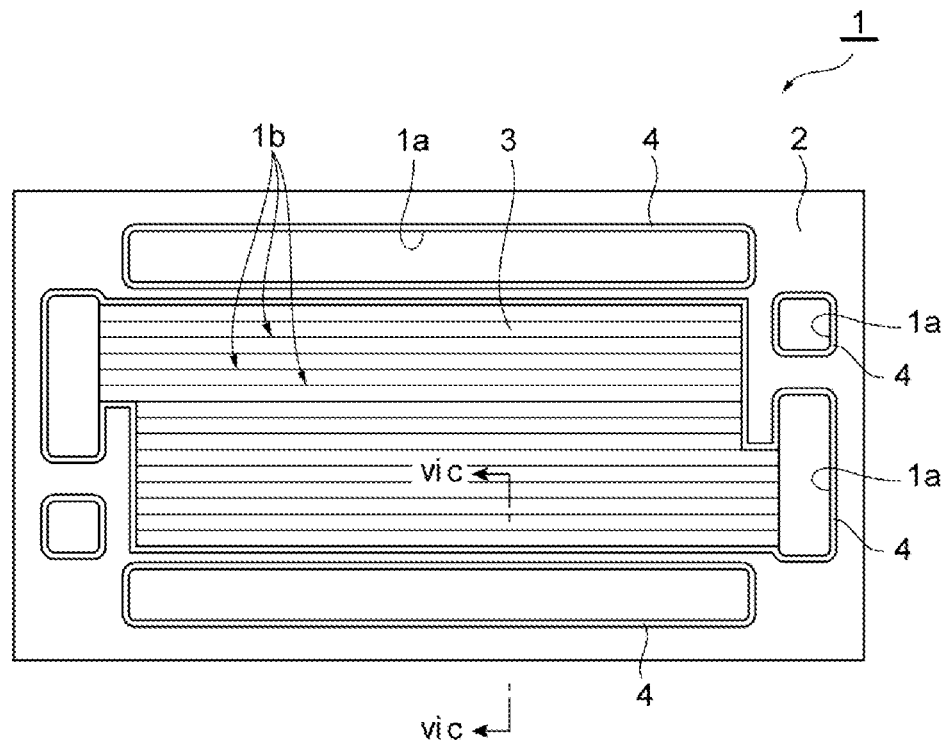
FIG. 6B is a schematic plan view of the substrate that is processed at the injection molding step of FIG. 6A.
Figure 6C:
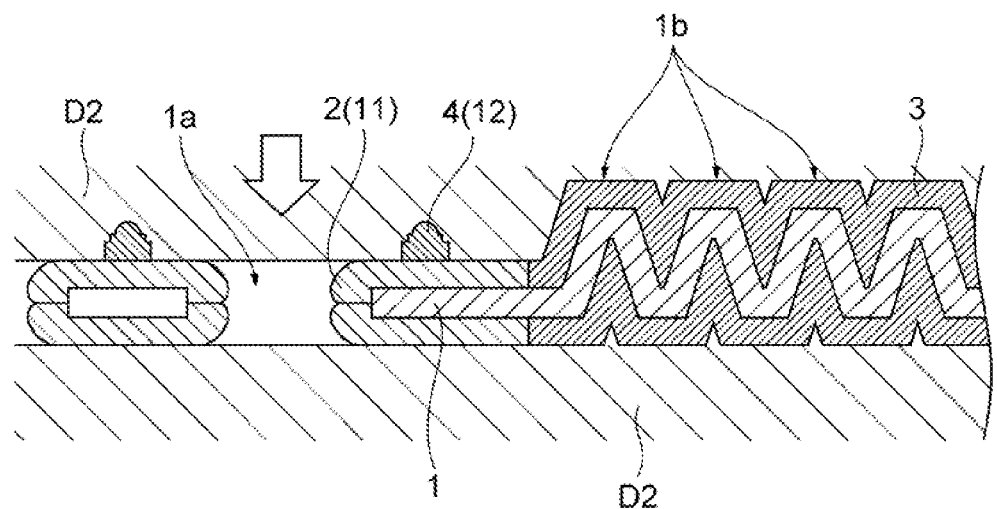
FIG. 6C is an enlarged cross-sectional view of the substrate at the injection molding step taken along the line vic-vic of FIG. 6B.

FIG. 6A schematically shows the injection molding step S125 of FIG. 1B. FIG. 6B is a schematic plan view of the substrate 1 that is processed at the injection molding step S125 of FIG. 6A. FIG. 6C is an enlarged cross-sectional view of the substrate 1 at the injection molding step S125 of FIG. 6A taken along the line vic-vic of FIG. 6B. The injection molding step S125 following the hot pressing step S124 is to place uncured thermosetting resin 4 at a part of the surface of the substrate 1 placed in the forming die D2 by injection molding, and to then heat the forming die D2 so as to pre-cure the uncured thermosetting resin 4 on the substrate 1.

More specifically the forming die D2 has a nested structure having a partially divided part, for example. After the hot pressing step S124, a nested die of the forming die D2 is changed so that it can injection-mold the thermosetting resin 4 on the surface of the substrate 1. In this injection molding step S125, the uncured thermosetting resin 4 is injection-molded for placing on the surface of the substrate 1 with this forming die D2. After that, the uncured thermosetting resin 4 is pre-cured by setting the heating temperature with the forming die D2 at about 180° C. and setting the heating time at about 10 seconds, for example.

Such uncured thermosetting resin 4 placed on the surface of the substrate 1 via the pre-cured thermosetting resin 2 at the injection molding step S125 includes ethylene-propylene-diene rubber (EPDM) having the time for cross-linkage of about 60 seconds, for example. After pre-curing at the injection molding step S125, the substrate 1 including the pre-cured thermosetting resin 4 undergoes demolding to remove the substrate from the forming die D2, and is then conveyed to the thermal treatment step S126.

Figure 7:
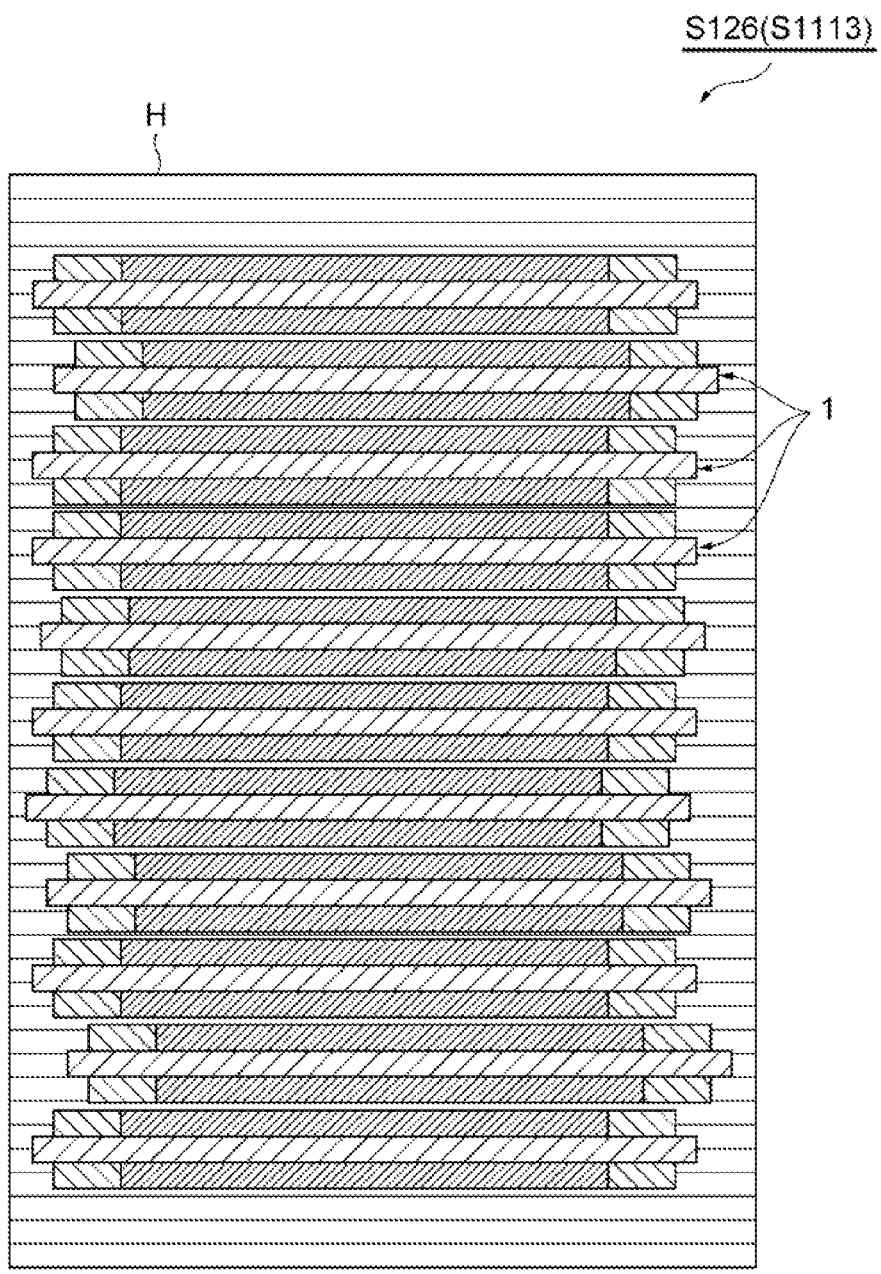
FIG. 7 schematically shows the thermal treatment step of FIG. 1B.

FIG. 7 schematically shows the thermal treatment step S126 of FIG. 1B. After the injection molding step S125, the substrate 1 is removed from the forming die D2, and a plurality of these substrates 1 is collected. The thermal treatment step S126 is to heat these plurality of substrates 1 collectively to cure the pre-cured thermosetting resin 2, 4 and collectively form the seal parts 11 and 12 on the plurality of substrates 1 (see FIG. 6C).

More specifically the plurality of substrates 1 subjected to the injection molding step S125 is placed on a tray and is stored in a continuous furnace H for thermal treatment with the heating temperature at about 150° C. and the heating time for about 50 seconds, for example. In this way, the pre-cured thermosetting resin 2, 3, 4 at the preceding steps is thermally cross-linked and thermally cured for curing. The continuous furnace H can store three hundreds or more of the substrates 1, for example. Through these steps, a separator for fuel cell can be manufactured, which has the seal parts 11 and 12 of thermosetting resin 2, 4 at least on the surface of the substrate 1 and on the inner wall of the through-holes 1a.

The insulating part applying step S122 and pressing at the hot pressing step S124 correspond to the placing step S111 as stated above. Heating at the hot pressing step S124 corresponds to the pre-curing step S112 as stated above. Injection molding at the injection molding step S125 corresponds to the placing step S111 as stated above, and heating at the injection molding step S125 corresponds to the pre-curing step S112 as stated above. The thermal treatment step S126 corresponds to the curing step S113 as stated above.

In this way, the method for manufacturing a separator for fuel cell S100 of the present embodiment is to manufacture a separator for fuel cell having seal parts 11, 12 of thermosetting resin. The method includes the placing step S111 to place uncured thermosetting resin 2, 4 on the substrate 1, the pre-curing step S112 to pre-cure the uncured thermosetting resin 2, 4 placed on the substrate 1, and the curing step S113 to cure the pre-cured thermosetting resin 2, 4 on the collected plurality of substrates 1 to collectively form the seal parts 11 and 12 on the plurality of substrates 1.

The following describes the advantageous effects of the method for manufacturing a separator for fuel cell S100 according to the present embodiment.

As stated above, the seal parts 11 and 12 of the separator for fuel cell are formed on the inner wall of the through-holes 1a of the substrate 1 or on a part of the surface of the substrate 1, such as a part surrounding the through-holes 1a. The seal part 11 formed on the inner wall of the through-holes 1a of the substrate 1 covers the inner wall of the through-holes 1a of the substrate 1 so that the inner wall of the through-holes 1a of the substrate 1 does not come in contact with reactant gas or coolant, for example. The seal part 12 on the surface of the substrate 1 functions as a seal for the conduit of coolant that is defined between the mutually opposed fuel cells when the fuel cells are stacked to be a fuel cell stack, for example, and prevents the leakage of the coolant.

As stated above, the method for manufacturing a separator for fuel cell S100 of the present embodiment is to manufacture a separator for fuel cell having seal parts 11, 12 of thermosetting resin 2, 4. The method includes the placing step S111 to place uncured thermosetting resin 2, 4 on the substrate 1 and the pre-curing step S112 to pre-cure the uncured thermosetting resin 2, 4 placed on the substrate 1. In this way, the pre-curing step S112 pre-cures the uncured thermosetting resin 2, 4 placed on the substrate 1. This can facilitate the handling of the substrate 1, such as conveyance, as compared with the substrate 1 having uncured thermosetting resin 2, 4 thereon.

The pre-curing step S112 does not have to cure the thermosetting resin 2, 4 completely. The forming die D2 can be used in a short-term cycle, and so the productivity of the method for manufacturing a separator for fuel cell S100 can improve. The placing step S111 and the pre-curing S112 can share the same forming die D2, and so the step for temperature rising and fall can be consolidated. This can improve the productivity of the method for manufacturing a separator for fuel cell S100.

The curing step S113 corresponding to the thermal treatment step S126 as stated above collects a plurality of substrates 1 subjected to the pre-curing step S112 and then cures the pre-cured thermosetting resin 2, 4 on the substrates 1 to collectively form the seal parts 11, 12 on the plurality of substrates 1. In this way, a plurality of substrates 1 are collected, and the seal parts 11 and 12 are collectively formed on the plurality of substrates 1. This can remarkably improve the productivity of the separator for fuel cell as compared with the method of curing the thermosetting resin 2, 4 for each substrate 1. The pre-curing step S112 pre-cures the thermosetting resin 2, 4, and this can prevent the flowing of the thermosetting resin 2, 4. In this way, the separator for fuel cell can have stable shape and position of the seal parts 11 and 12 of the thermosetting resin 2, 4.

In the method for manufacturing a separator for fuel cell S100 of the present embodiment, the placing step S111 includes the applying step S111a corresponding to the insulating part applying step S122 as stated above and the pressurizing step S111b corresponding to the pressing at the hot pressing step S124 as stated above. The applying step S111a is to apply uncured thermosetting resin 2 on the surface of a substrate 1. The pressurizing step S111b is to place the substrate 1 in a forming die D2 and pressurize the uncured thermosetting resin 2 applied on the surface of the substrate 1 at the applying step S111a with the forming die D2 to allow the resin to flow into through-holes 1a of the substrate 1. Thereby the uncured thermosetting resin 2 is placed on the inner wall of the through-holes 1a. In this case, the hot pressing step S124, which is a currently-existing step in the method for manufacturing a separator for fuel cell S100, can complete the placing step S111 during the step. This can reduce the number of steps, and can improve the productivity of the method for manufacturing a separator for fuel cell.

The method for manufacturing a separator for fuel cell S100 of the present embodiment includes the second placing step S111. In this step, uncured thermosetting resin 4 is placed by injection molding on the substrate 1 in the forming die D2. The method also includes the second pre-curing step S112. In this step, the forming die D2 is heated so as to pre-cure the uncured thermosetting resin 4 placed on the substrate 1 at the second placing step S111. This enables the placing step S111 and the pre-curing step S112 using the forming die D2, and so can improve the productivity of the method for manufacturing a separator for fuel cell.

The method for manufacturing a separator for fuel cell S100 of the present embodiment includes the placing step S111 and the pre-curing step S112 that are repeated a plurality of number of times before the curing step S113 as stated above. For the structure of a separator for fuel cell having seal parts 11 and 12 at a plurality of different positions, this enables appropriate placing step S111 and pre-curing step S112 depending on the positions of the seal parts 11 and 12, and so can improve the productivity of the method for manufacturing a separator for fuel cell.

As described above, one embodiment of the present disclosure as stated above can provide a method for manufacturing a separator for fuel cell S100 that can improve the productivity without changing a shape and a position of the seal parts 11 and 12 of the thermosetting resin 2, 4 to be formed on the separator for fuel cell as compared with the conventional method.

For the thermosetting resin 2, 3, 4, similar materials having the thermosetting temperature and thermally cross-linking temperature of 100° C. or higher and 200° C. or lower are preferably used. This allows the cross-linking of the thermosetting resin 2, 3 and 4 to be performed collectively at the curing step S113.

That is a detailed description of one embodiment of the present disclosure. The specific configuration of the present disclosure is not limited to the above-stated embodiment, and the design may be modified variously without departing from the spirits of the present disclosure. The present disclosure also covers such modified embodiments.

DESCRIPTION OF SYMBOLS

1 Substrate
1a Through-hole
2 Thermosetting resin
4 Thermosetting resin
11 Seal part
12 Seal part
D2 Forming die
S100 Method for manufacturing separator for fuel cell
S111 Placing step
S111a Applying step
S111b Pressurizing step
S112 Pre-curing step
S113 Curing step

What is claimed is:
1. A method for manufacturing a separator for fuel cell that includes a seal part of thermosetting resin, comprising:
   a placing step of placing uncured thermosetting resin on a substrate;
   a pre-curing step of pre-curing the uncured thermosetting resin placed on the substrate; and
   a curing step of collecting a plurality of the substrates and curing the pre-cured thermosetting resin to collectively form the seal parts on the plurality of substrates.

2. The method for manufacturing a separator for fuel cell according to claim 1, wherein the placing step includes:
   an applying step of applying the uncured thermosetting resin on a surface of the substrate; and
   a pressurizing step of placing the substrate in a forming die and pressurizing the uncured thermosetting resin applied on the surface of the substrate at the applying step with the forming die to allow the resin to flow into a through-hole of the substrate so as to place the uncured thermosetting resin on an inner wall of the through-hole.

3. The method for manufacturing a separator for fuel cell according to claim 1, wherein
   the placing step places the thermosetting resin that is uncured by injection molding on the substrate placed in a forming die, and
   the pre-curing step heats the forming die to pre-cure the uncured thermosetting resin placed on the substrate at the placing step.

4. The method for manufacturing a separator for fuel cell according to claim 1, wherein the placing step and the pre-curing step are repeated a plurality of times before the curing step.

\* \* \* \* \*